US009592578B2

(12) United States Patent
Beier et al.

(10) Patent No.: US 9,592,578 B2
(45) Date of Patent: Mar. 14, 2017

(54) METHOD OF MANUFACTURING AN ASSEMBLY TO COUPLE AN OPTICAL FIBER TO AN OPTO-ELECTRONIC COMPONENT

(71) Applicant: CCS Technology, Inc., Wilmington, DE (US)

(72) Inventors: Joachim Rudolf Beier, Munich (DE); Karsten Contag, Gilching (DE); Markus Meinelt, Dietramszell (DE); Dirk Richter, Munich (DE); Angela Rief, Ismaning (DE); Wolfgang Gottfried Tobias Schweiker, Weyarn (DE)

(73) Assignee: CCS TECHNOLOGY, INC., Wilmington, DE (US)

( * ) Notice: Subject to any disclaimer, the term of this patent is extended or adjusted under 35 U.S.C. 154(b) by 177 days.

(21) Appl. No.: 14/035,414

(22) Filed: Sep. 24, 2013

(65) Prior Publication Data

US 2014/0208562 A1    Jul. 31, 2014

(30) Foreign Application Priority Data

Sep. 28, 2012  (EP) ..................................... 12186590

(51) Int. Cl.
*G02B 6/42*    (2006.01)
*B23P 19/10*   (2006.01)

(52) U.S. Cl.
CPC ............ *B23P 19/10* (2013.01); *G02B 6/4203* (2013.01); *G02B 6/4214* (2013.01);
(Continued)

(58) Field of Classification Search
CPC .. G02B 6/29361; G02B 6/421; G02B 6/4214; G02B 6/4215; G02B 6/4246
(Continued)

(56) References Cited

U.S. PATENT DOCUMENTS 5,023,447 A   6/1991   Masuko et al. .......... 250/227.24
5,155,786 A   10/1992  Ecker et al. .................... 385/94
(Continued)

FOREIGN PATENT DOCUMENTS

DE   4008483 A1   9/1991
DE   10307763    9/2004
(Continued)

OTHER PUBLICATIONS

European Search Report issued in corresponding EP Appln. No. 12186590 dated Oct. 31, 2013.

*Primary Examiner* — Minh Trinh

(57) ABSTRACT

A method of manufacturing an assembly to couple an optical fiber to an opto-electronic component includes providing the optical fiber having an end section with a front face to couple light in and out of the optical fiber, providing a housing to encase the end section of the optical fiber. The housing is formed with an opening to receive the optical fiber. The method further includes inserting the optical fiber in the opening such that the end section of the optical fiber is disposed inside the housing, attaching the optical fiber to a surface of the housing arranged to form a boundary of the opening, and aligning the front face of the optical fiber to the opto-electronic component.

22 Claims, 8 Drawing Sheets

(52) U.S. Cl.
CPC .......... *G02B 6/4224* (2013.01); *G02B 6/4239* (2013.01); *G02B 6/4243* (2013.01); *G02B 6/4248* (2013.01); *Y10T 29/4978* (2015.01); *Y10T 29/53* (2015.01)

(58) Field of Classification Search
USPC .......... 29/868, 592.1; 385/89, 88, 49, 76–81
See application file for complete search history.

(56) References Cited

U.S. PATENT DOCUMENTS

| | | | |
|---|---|---|---|
| 5,163,113 A | 11/1992 | Melman | 385/31 |
| 5,390,271 A | 2/1995 | Priest | 385/92 |
| 5,515,468 A | 5/1996 | DeAndrea et al. | 385/88 |
| 6,062,741 A | 5/2000 | Tachigori | 385/88 |
| 6,081,638 A | 6/2000 | Zhou | 385/31 |
| 6,389,202 B1 | 5/2002 | Delpiano et al. | 385/49 |
| 6,445,854 B1 | 9/2002 | Miller | |
| 6,522,673 B1 * | 2/2003 | Williamson, III | H01S 5/02284 372/29.021 |
| 6,797,989 B2 * | 9/2004 | Bendelli | G02B 6/4201 257/422 |
| 6,856,728 B2 | 2/2005 | Zhang | |
| 7,021,833 B2 | 4/2006 | Loh et al. | 385/88 |
| 7,039,275 B2 | 5/2006 | Williamson | |
| 7,057,158 B2 | 6/2006 | Luo | |
| 7,148,465 B2 | 12/2006 | Blauvelt et al. | |
| 7,410,304 B2 | 8/2008 | Heiks | |
| 7,720,332 B2 | 5/2010 | Park et al. | |
| 2003/0007531 A1 | 1/2003 | Aggerstam | |
| 2003/0091301 A1 * | 5/2003 | Lee | G02B 6/4249 385/89 |
| 2003/0109142 A1 | 6/2003 | Cable et al. | 438/708 |
| 2004/0037519 A1 * | 2/2004 | Kilian | G02B 6/4202 385/94 |
| 2004/0202478 A1 * | 10/2004 | Melchior | G02B 6/421 398/141 |
| 2006/0177183 A1 | 8/2006 | Imanbayev et al. | 385/89 |
| 2008/0152285 A1 * | 6/2008 | Ghahremani | G02B 6/4228 385/92 |
| 2009/0202199 A1 * | 8/2009 | Sameshima | G02B 6/1221 385/15 |
| 2013/0215924 A1 | 8/2013 | Brennan et al. | |
| 2014/0346693 A1 | 11/2014 | Hartkorn | |

FOREIGN PATENT DOCUMENTS

| | | | |
|---|---|---|---|
| EP | 0872748 | 10/1998 | |
| JP | 64042611 | 2/1989 | |
| JP | 9-90177 A | 4/1997 | ............ G02B 6/42 |
| JP | 2003279761 | 10/2003 | |
| JP | 2004029492 | 1/2004 | |
| WO | 9709743 | 3/1997 | |
| WO | 2011040830 | 4/2011 | |
| WO | WO 2011/056733 A2 | 5/2011 | ............ G02B 6/42 |

* cited by examiner

METHOD OF MANUFACTURING AN ASSEMBLY TO COUPLE AN OPTICAL FIBER TO AN OPTO-ELECTRONIC COMPONENT

PRIORITY APPLICATIONS

This application claims the benefit of priority under 35 U.S.C. §119 of European Patent Application Serial No. 12186590.1 filed on Sep. 28, 2012, the content of which is relied upon and incorporated herein by reference in its entirety.

BACKGROUND

Field of the Disclosure

The disclosure relates to a method of manufacturing an assembly to couple an optical fiber to an opto-electronic component, such as a laser diode or a photodetector. The disclosure also relates to an assembly to couple an optical fiber to an opto-electronic component.

Technical Background

Coupling technologies for coupling an optical fiber to an opto-electronic component, such as a laser diode or a photodetector, are a central part in today's high data rate telecommunications market. Fiber coupling is used in every device that uses an EOE (electric to opto-electronic) conversion such as transceiver modules and most variants of Active Optical Cable.

One main aspect in coupling technologies is to align the optical fiber to the opto-electronic component so that light is transferred between the optical fiber and the opto-electronic component without significant loss. The light may be coupled out of the fiber by a total internal reflection (TIR) at a front face of the end section of the optical fiber. Air-tight sealing of the end section of the optical fiber is important in order to ensure total internal reflection at a glass-air interface, and to prevent moisture condensation and other surface degradation of the front face of the optical cable by humidity or dirt.

It is a desire to provide a method of manufacturing an assembly to couple an optical fiber to an opto-electronic component which enables a nearly lossless transfer of light between the optical fiber and the opto-electronic component and an air-tight sealing of the optical transmission path between the optical fiber and the opto-electronic component. It is a further desire to provide an opto-electronic assembly to couple an optical fiber to an opto-electronic component which enables a nearly lossless transfer of light between the optical fiber and the opto-electronic component and an air-tight sealing of the optical transmission path between the optical fiber and the opto-electronic component.

SUMMARY

Embodiments disclosed in the detailed description include a method of manufacturing an assembly to couple an optical fiber to an opto-electronic. According to an embodiment of a method of manufacturing an assembly to couple an optical fiber to an opto-electronic component, the method includes providing the optical fiber having an end section with a front face to couple light in and out of the optical fiber, providing a housing to encase the end section of the optical fiber, wherein the housing is formed with an opening to receive the optical fiber, inserting the optical fiber in the opening such that the end section of the optical fiber is disposed inside the housing, attaching the optical fiber to a surface of the housing, the surface being arranged to form a boundary of the opening, aligning the front face of the optical fiber to the opto-electronic device such that light coupled out of the front face of the optical fiber is coupled into the opto-electronic device or light coupled out of the opto-electronic device is coupled into the optical fiber at the front face of the optical fiber.

According to an embodiment of the assembly to couple an optical fiber to an opto-electronic component the assembly comprises a substrate with an opto-electronic component disposed thereon and a housing to encase an end section of the optical fiber. The housing comprises an opening to dispose the end section of the optical fiber inside the housing and a surface being arranged to form a boundary of the opening. The surface is slanted in relation to the substrate such that the end section of the optical fiber is disposed closer to the opto-electronic device than a section of the optical fiber disposed in the opening of the housing when disposing the optical fiber inside the housing.

The method and the assembly enable to align optical fibers to opto-electronic components and hermetically seal the assembly, where the front face of the optical fiber is prepared for total internal reflection. In a possible embodiment, the optical fiber is mounted to a fiber support. The front face of the optical fiber is provided, for example by laser cutting the end section of the optical fiber, with a slanted surface having at an angle of approximately 45° to 60° between the surface of the front face and a transverse axis of the optical fiber being perpendicularly oriented in respect to a longitudinal axis of the optical fiber. The end section of the optical fiber is aligned to the opto-electronic component, for example by using a vision system, using alignment marks of a substrate on which the opto-electronic component is mounted, using alignment marks of the housing or using an alignment mark of the fiber support. The fiber support is fixed to the substrate, for example a PCB board or a silicon substrate. After that the housing may be placed on the substrate, wherein the housing encloses the fiber support, the front face of the optical fiber and the opto-electronic component. The housing is fixed to the substrate by using any suitable adhesive, for example, epoxy, which also can fill any gaps between the housing and the optical fiber or the fiber support, thus achieving a nearly hermetic sealing.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1:
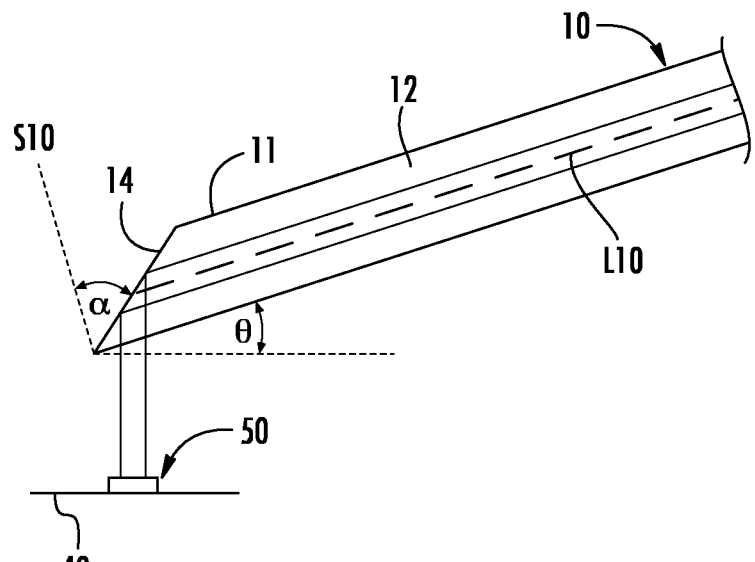
FIG. 1 shows a transmission of light between an optical fiber and an opto-electronic component.

FIG. 1 shows a transmission of light between an optical fiber 10 and an opto-electronic component 50. The opto-electronic component 50 may be mounted to a substrate 40. The optical fiber 10 has a rearmost section 12 and a front end section 11 with a slanted front face 14. The front face is arranged so that light transferred through the optical fiber experiences a total internal reflection at the slanted front face 14 of the optical fiber. In order to achieve total internal reflection at the front face 14 an angle α between an axis S10 of the optical fiber which is directed perpendicular to a longitudinal axis L10 of the optical fiber has to fulfil the condition $\sin \alpha \geq n_2/n_1$ with $n_1$ being the index of refraction inside the optical fiber 10 and $n_2$ being the index of refraction of the surrounding medium. For a single mode optical fiber with typically $n_2=1.47$ and air as the surrounding medium with $n_2=1$, total internal reflection occurs for α>43°. After the light beam is reflected at the slanted front face 14 of the end section 11 of the optical fiber, light is coupled out at the bottom side of the optical fiber and may strike the opto-electronic component 50 which may be mounted on a substrate 40 below the optical fiber 10.

An appropriate angle α to achieve high coupling efficiency between the optical fiber 10 and the opto-electronic component 50 also depends on other parameters like numerical aperture of the optical fiber, lens effect of the optical fiber and the emission or receiving properties of the opto-electronic component. An optimum angle α can be on the order of 45° to 60°, for example 51°.

Since the light is usually not coupled out of the optical fiber in a direction perpendicular to the direction of the longitudinal axis of the optical fiber, it is necessary that the optical fiber is deviated out of a horizontal direction which is parallel to the substrate 40. In the example shown in FIG. 1 the optical fiber 10 is deviated by a tilt angle θ between the longitudinal axis L10 of the optical fiber and a horizontal virtual plane which is parallel to the substrate 40. For α=45° the tilt angle θ is θ≈0°. For an angle α>45° typically the optimum tilt angle θ is greater than 0°. The tilt angle θ to enable that nearly the whole light coupled out of the optical fiber 10 is directed towards the opto-electronic component 50 may be in the order of between 10° and 18°.

Figure 2:
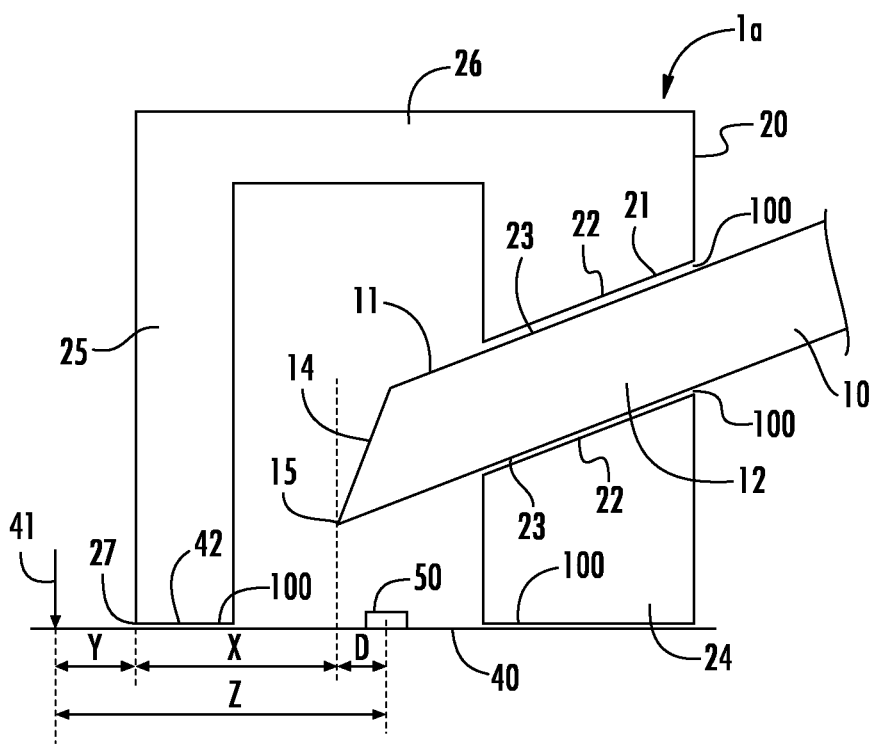
FIG. 2 shows a first embodiment of an assembly to couple an optical fiber to an opto-electronic component.

FIG. 2 shows an embodiment of an assembly 1a to couple an optical fiber 10 to an opto-electronic component 50. The opto-electronic component 50 is mounted to the substrate 40. The substrate 40 may be configured as a PCB (Printed Circuit Board), but can also be a PWB (Printed Wire Board) or a substrate where the opto-electronic component 50 is integrated to, for example an SOI (Silicon-On-Insulator). The assembly 1a comprises a housing 20 to encase the end section 11 of the optical fiber 10. The housing 20 is formed with an opening 21 to receive the optical fiber 10. The optical fiber 10 is inserted in the opening 21 of the housing such that the end section 11 of the optical fiber is disposed inside the housing 20 and the adjacent section 12 of the optical fiber is disposed in the opening 21.

The housing 20 may be formed of a unique material block, for example of a plastic material, comprising sidewalls 24, 25 and a covering portion 26 being located between the sidewalls 24, 25 and forming the roof of the housing. The opening 21 is provided in the sidewall 24 which may be formed with a larger width than the other sidewalls of the housing. The thickness of the sidewall 24 may be larger than the diameter of the optical fiber 10 so that the optical fiber is guided in the opening 21 of the sidewall 24. The opening 21 is surrounded by surfaces 22 of the sidewall 24, wherein a gap 23 is provided between the surface 22 of the housing 20 and the optical fiber 10. The sidewall 24 is thick enough and the dimensions of the opening 21 are precise enough to achieve sufficient precision of the direction of the optical fiber 10.

The front face 14 of the end section 11 of the optical fiber may be shaped with a tapered surface before inserting the optical fiber 10 into the opening 21. It is also conceivable to shape the front face 14 completely or partly after the optical fiber has been inserted and fixed to the housing 20. After having inserted the optical fiber 10 in the opening 20, the section 12 of the optical fiber 10 is attached to the surface 22 of the housing forming the boundary of the opening 21. For this purpose the gap 23 between the surface 22 and the optical fiber 10 is filled with an adhesive 100. The housing 20 with the attached optical fiber 10 is mounted to the substrate 40. The housing may be attached to the substrate 40 by disposing the adhesive 100 in a gap 42 between the housing 20 and the substrate 40.

The end section 11 of the optical fiber may be shaped with a slanted front face by laser-cutting/laser-cleaving the optical fiber at the angle α or by polishing the end section 11 before inserting the optical fiber 10 in the housing 20 or after the optical fiber 10 has been inserted inside the housing 20. The fiber end section 11 may be cleaved by a laser device at an angle α between 40° and 60° in relation to the transverse axis S10 of the optical fiber which is directed perpendicular to the longitudinal axis L10 of the optical fiber so that light is totally reflected at the slanted front face 14 of the optical fiber.

With respect to the alignment of the optical fiber 10 to the opto-electronic component 50 to achieve highly efficient coupling between the optical fiber 10 and the opto-electronic component 50, the housing 20 may comprise an alignment feature 27 which may be the outer side of the sidewall 25. According to an embodiment of aligning the optical fiber, the optical fiber 10 is positioned inside the housing 20 and an area 15 of the front face can be aligned with a distance x with respect to the alignment feature 27 of the housing, for example to an outer edge of the sidewall 25 of the housing before fixing it to the housing. The area 15 can be the location of the front face 14 which is closest to the surface of the substrate 40. That means the area 15 can be the foremost tip or edge of the end section of the optical fiber. The housing 20 is positioned on the substrate 40 such that the alignment feature 27 of the housing 20 is aligned relative to an alignment feature 41 of the substrate 40 in a way that the front face 14 of the optical fiber is aligned to the opto-electronic component 50 to couple light from the optical fiber into the opto-electronic component 50 or to couple light out of the opto-electronic component 50 into the optical fiber with low loss.

According to another embodiment to align the optical fiber 10 to the opto-electronic component 50, the optical fiber 10 is just coarsely positioned inside the housing 20. The position of the front face 14 or the area 15 is measured relative to the alignment feature 27 of the housing, for example relative to two edges 27 of the housing, using a vision system. The measured distance between the foremost edge 15 of the front face 14 and the alignment feature 27 of the housing is labeled by x in FIG. 2. The position of the opto-electronic component 50, relative to the alignment feature 41 of the substrate, is either known or measured by a vision system. The distance between the alignment feature 41 of the substrate and the opto-electronic component 50 is denoted with z. The housing 20 is then placed on the substrate 40 and aligned to the alignment mark 41 of the substrate. For this, a distance between the alignment feature 27 of the housing 20 relative to the alignment feature 41 of the substrate 40 which is labeled as distance y in FIG. 1 is calculated from the distances x, z and a distance D.

The distance D specifies a desired distance between the area 15 of the front face 14, for example the foremost edge of the front face 14, and the opto-electronic component 50 which is necessary to provide an efficient coupling between the optical fiber 10 and the opto-electronic component 50. The housing 20 is positioned on the substrate 40 such that the alignment feature 27 of the housing is located by the distance y far away from the alignment mark 41 of the substrate so that the sum of the distances D, x and y is identical to a distance z between the opto-electronic component 50 and the alignment mark 41 of the substrate. After placement of the housing 20 on the substrate 40, the housing 20 is fixed on the substrate 40 by applying an adhesive 100 in the gap 42 between the sidewalls 24, 25 of the housing and the substrate 40.

Figure 3:
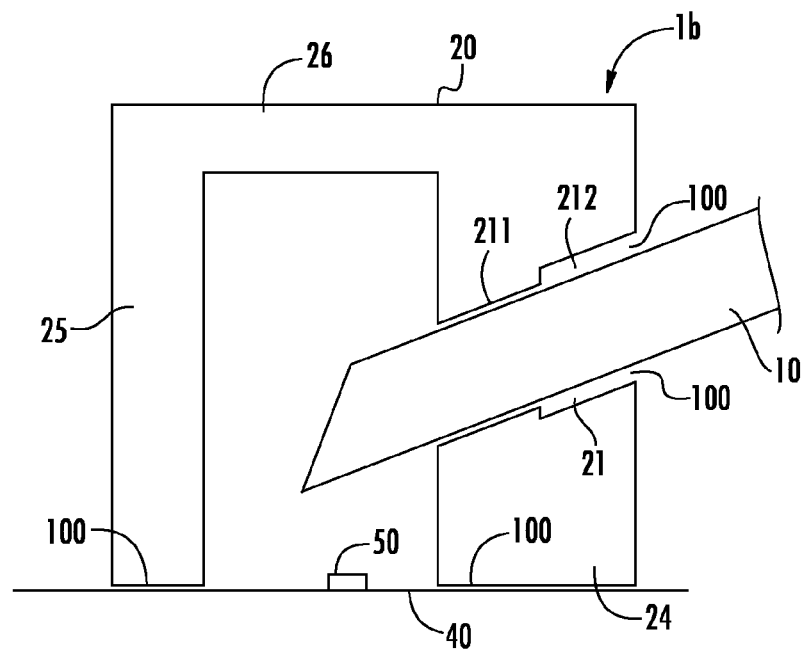
FIG. 3 shows a second embodiment of an assembly to couple an optical fiber to an opto-electronic component.

FIG. 3 shows an embodiment of an assembly 1b to couple the optical fiber 10 to the opto-electronic component 50 mounted on the substrate 40. The housing 20 comprising sidewalls 24, 25 and a covering portion 26. The housing may be attached to the substrate 40 by an adhesive 100. The sidewall 24 includes an opening 21. In contrast to the embodiment shown in FIG. 2, the opening 21 comprises a section 211 and a section 212 coupled together, wherein the section 211 of the opening 21 is coupled to the inside of the housing 20 and the section 212 is coupled to the outside of the housing 20. The section 212 has a wider diameter than the section 211. The section 212 of the opening may have a diameter which is larger than the diameter of the section 211 of the opening 21. The section 212 of the opening 21 is formed to provide a reservoir for the adhesive 100 and thus to improve adhesion of the optical fiber 10 to the housing 20.

Figure 4:
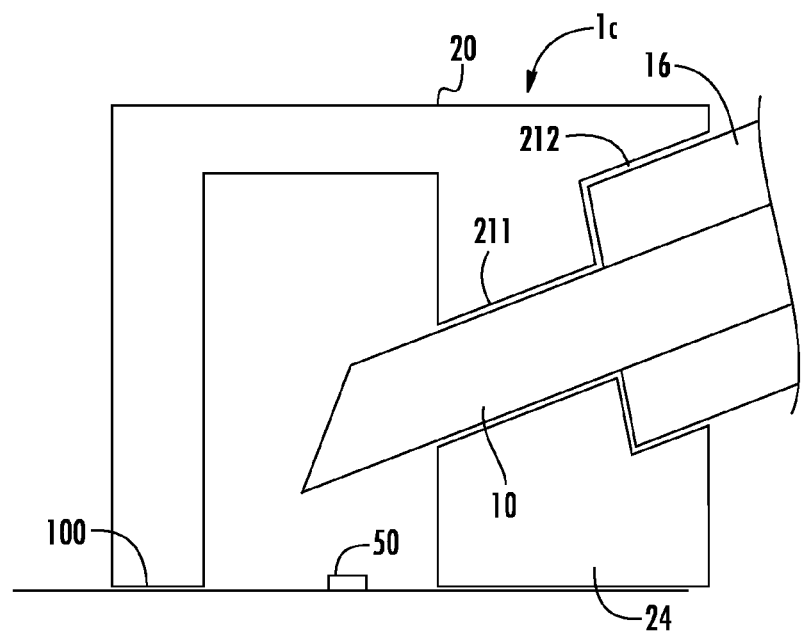
FIG. 4 shows a third embodiment of an assembly to coupled an optical fiber to an opto-electronic component.

FIG. 4 shows an embodiment of an assembly 1c to couple the optical fiber 10 to the opto-electronic component 50 mounted on the substrate 40. The housing may be fixed to the substrate by the adhesive 100. The opening 21 is formed in the sidewall 24 of the housing, wherein the opening comprises a section 211 and a section 212 coupled together. The section 211 of the opening 21 is coupled to the inside of the housing and the section 212 is coupled to the outside of the housing. The section 212 has a larger diameter than the section 211. The outer section 212 shown in the embodiment of the assembly 1c of FIG. 4 is larger than the inner section 211 of the opening in a range of about 1 mm. The section 212 of the opening is formed as a recess in the sidewall 24 of the housing to enable supporting a coating 16 of the optical fiber 10, when inserting the optical fiber 10 in the opening 21. The recess 212 enables that the fiber coating 16 surrounding a core of the optical fiber can be fixed as well at the housing.

Figure 5:
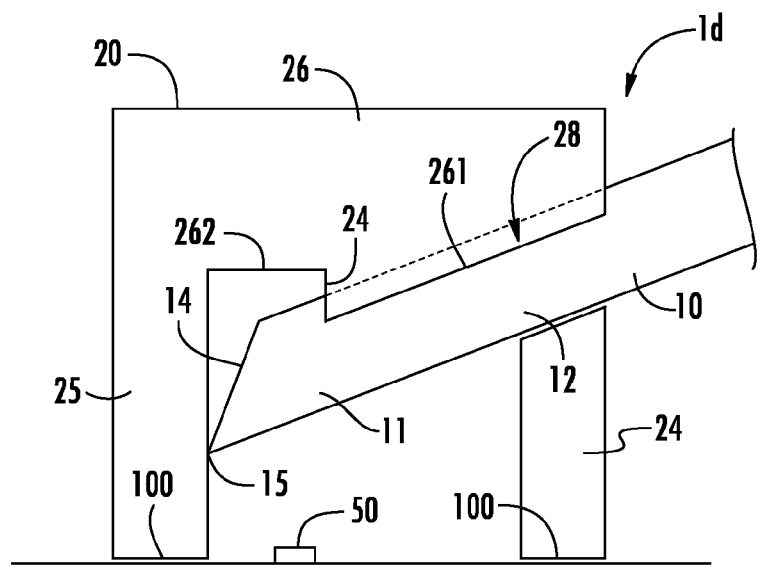
FIG. 5 shows a fourth embodiment of an assembly to couple an optical fiber to an opto-electronic component.

FIG. 5 shows an embodiment of an assembly 1d for coupling the optical fiber 10 to the opto-electronic component 50. The housing 20 is attached to the substrate 20 carrying the opto-electronic component 50 by the adhesive 100. In this variant a groove 28 for the optical fiber 10 is provided on the inner side of the covering portion 26 of the housing. The cavity 28 can be formed as a v-shaped groove or a u-shaped groove. The groove provides improved precision to the fiber location. Furthermore the optical fiber 10 can be fixed inside the groove using any adhesive so that the distance between the optical fiber 10 and the opto-electronic component 50 is controlled more precisely. For fixing the optical fiber with adhesive to the covering portion 26, the housing may be held in an upside-down position.

The covering portion 26 of the housing is formed such that a surface 261 in which the groove is provided is slanted with respect to the surface of the substrate 40 so that the end section 11 of the fiber is disposed inside the housing with a tilt angle θ. A recess 29 is provided between the slanted surface 261 of the covering portion 26 and a horizontal surface 262 of the covering portion 26 of the housing. The recess 29 enables to avoid any wetting of the front face 14 of the optical fiber with the adhesive 100. The section 12 of the optical fiber 10 is inserted in the opening 21 of the housing 20 such that the foremost area 15 of the front face 14 of the optical fiber 10, i.e. the foremost fiber tip 15, is in contact with the sidewall 25 located opposite to the sidewall 24 of the housing.

This enables that the end face 14 has a defined position in all three orthogonal directions, relative to the housing. In this way, when the housing 20 is placed on the substrate 40, and aligned by a vision system or passively relative to some alignment features on the substrate, the fiber front face 14 will be aligned to the opto-electronic component 50 for the transmission of light between the optical fiber 10 and the opto-electronic component 50.

Figure 6:
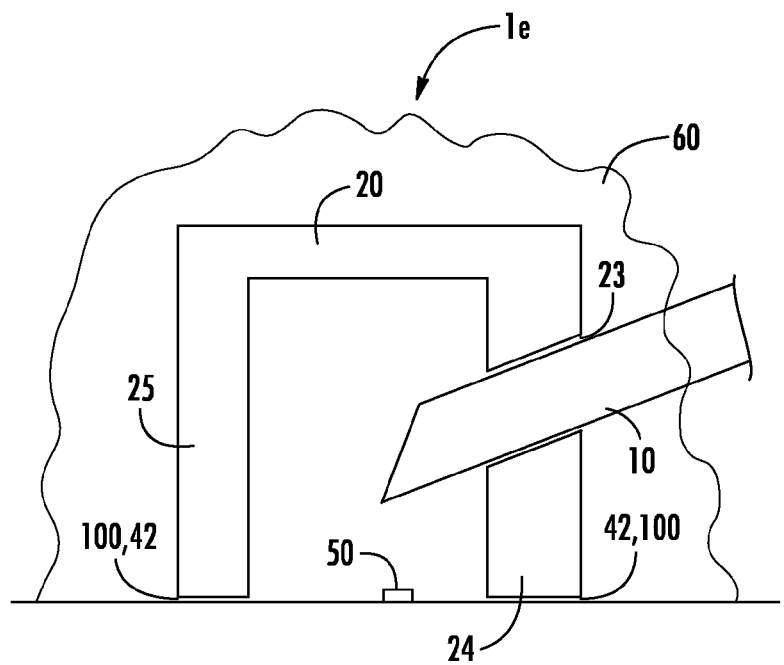
FIG. 6 shows a fifth embodiment of an assembly to couple an optical fiber to an opto-electronic component.

FIG. 6 shows an embodiment of an assembly 1e to couple an optical fiber 10 to an opto-electronic component 50. The opto-electronic component 50 is mounted to the substrate 40 and the housing is fixed to the substrate by attaching the sidewalls 24, 25 to the substrate 40 by means of the adhesive 100. FIG. 6 exemplifies the embodiment of the assembly 1a which is sealed by a sealing component 60. The sealing component nearly hermetically surrounds the housing 20 and any gaps 23 between the housing 20 and the optical fiber 10 and any small gaps 42 between the housing 20 and the substrate 40 so that the end section 11 of the optical fiber is protected against any moisture condensation and other surface degradation of the front face of the optical fiber by humidity or dirt. It should be noted that the embodiments 1a through 1d of the assembly to couple the optical fiber 10 to the opto-electronic component 50 may be sealed by the sealing component 60 in the same way as shown in FIG. 6 for the embodiment 1a of the assembly.

Figure 7A:
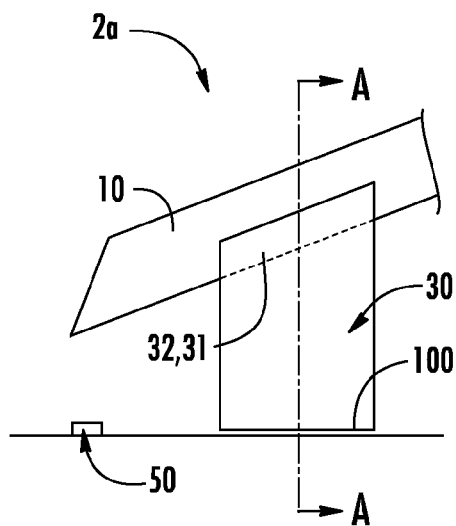
FIG. 7A shows a first embodiment of a supporting device to support an optical fiber.
Figure 7B:
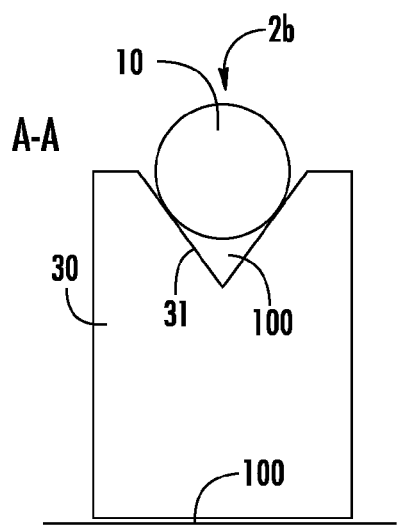
FIG. 7B shows a second embodiment of a supporting device to support an optical fiber.
Figure 7C:
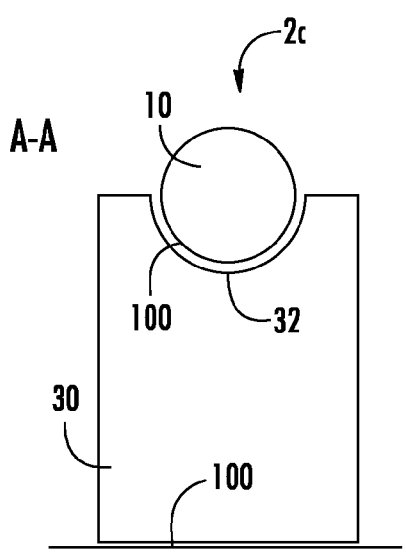
FIG. 7C shows a third embodiment of a supporting device to support an optical fiber.

FIG. 7A shows an embodiment 2a of a supporting device 30 to support the optical fiber 10. The supporting device may comprise a cavity or groove 31, 32 in which the optical fiber 10 may be placed. The supporting device 30 may be made of different materials, for example silicon or ceramics, which assure the necessary precision of the fiber position inside the housing 20. The supporting device 30 may be made of molded plastic such as polyetherimide (PEI), polyether ether ketone (PEEK) or polycarbonate (PC), but other materials are possible. The optical fiber may be attached to the supporting device 30 by providing an adhesive 100 in the groove 31, 32 of the supporting device 30. The supporting device 30 may be mounted to the substrate 40 by also using an adhesive, such as epoxy. The supporting device is provided with a groove which is long enough to provide sufficient precision for the direction of the optical fiber. The groove of the supporting device 30 is slanted in relation to the surface of the substrate 40 so that the optical fiber 10 is disposed in the cavity 31, 32 of the supporting device 30 such that the optical fiber is tilt by the angle θ between the plane of the substrate 40 and the longitudinal axis of the optical fiber. FIG. 7B shows an embodiment 2b of the supporting device 30 with a v-shaped groove 31. FIG. 7C shows an embodiment 2c of the supporting device 30 with a u-shaped groove 32 for positioning the optical fiber.

After mounting the optical fiber to the supporting device 30, the end section 11 of the optical fiber may be shaped, for example by laser-cutting or by polishing the end section 11, so that the front face 14 is tapered by the angle α between the vertical axis S10 and the front face 14 of the optical fiber. After tapering the end section 11 of the optical fiber supported by the supporting device 30, the supporting device 30 is mounted on the substrate 40 which carries the opto-electronic component 50. The supporting device 30 may be fixed to the substrate 40, using an adhesive like epoxy, but could also be soldered to the substrate 40.

Figure 8A:
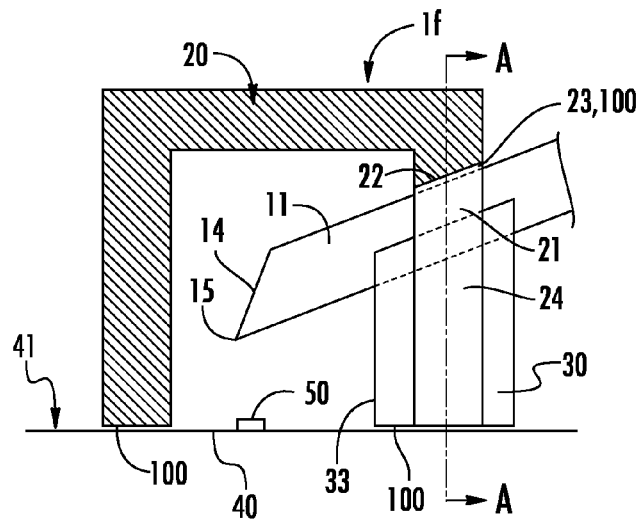
FIG. 8A shows a sixth embodiment of an assembly to couple an optical fiber to an opto-electronic component.
Figure 8B:
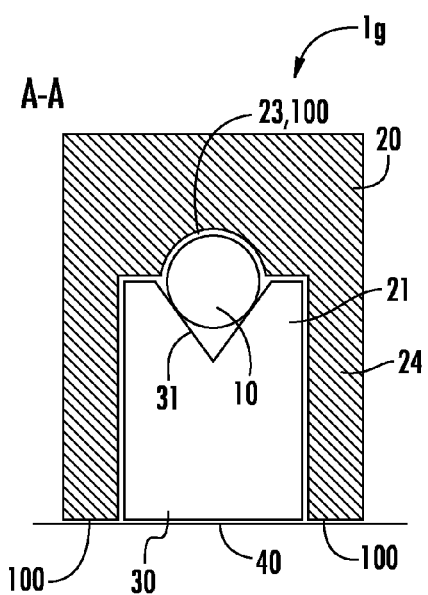
FIG. 8B shows a seventh embodiment of an assembly to couple an optical fiber to an opto-electronic component.
Figure 8C:
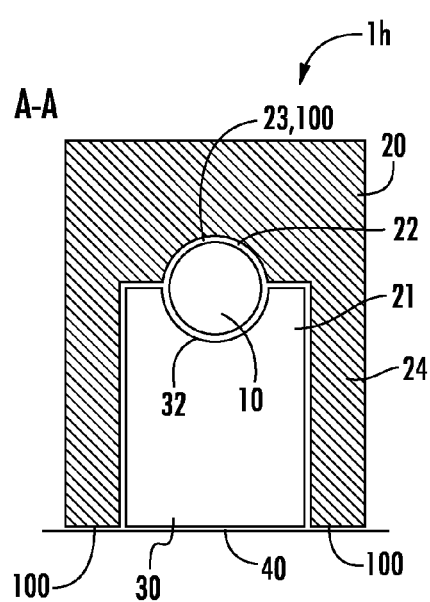
FIG. 8C shows an eighth embodiment of an assembly to couple an optical fiber to an opto-electronic component.

FIGS. 8A, 8B and 8C show different embodiments of an assembly 1f, 1g and 1h to couple the optical fiber 10 to the opto-electronic component 50 wherein the optical fiber 10 is mounted to the supporting device 30 and the end section 11 of the optical fiber is encased by the housing 20. The casing 20 surrounds the opto-electronic component 50 mounted to the substrate 40. The casing 20 may be fixed to the substrate by means of the adhesive 100. As shown in FIGS. 8A, 8B and 8C each of the casings 20 comprises an opening 21 at the sidewall 24. The opening of the sidewall 24 is formed to dispose the supporting device 30 in the opening 21. FIG. 8B shows an embodiment in which the supporting device 30 comprises a v-shaped groove as shown for the supporting device 30 according to the embodiment 2b of FIG. 7B. FIG. 8C shows an embodiment in which the supporting device 30 comprises a u-shaped groove as shown for the supporting device 30 according to the embodiment 2c of FIG. 7C. The gaps 23 between the optical fiber 10 and the surface 22 of the opening 21 may be filled with an adhesive 100 to attach the optical fiber to the housing and to seal the gaps 23. The housing may be fixed to the substrate by an adhesive 100.

In order to align the optical fiber 10 to the opto-electronic component 50 to couple light out of the optical fiber and into the opto-electronic device 50 or to couple light out of the opto-electronic component 50 into the optical fiber 10, the supporting component 30 is provided with an alignment feature 33 and the substrate 40 is provided with the alignment feature 41. The optical fiber 10 is positioned in the supporting device 30 so that an area 15 of the front face 14 of the optical fiber, being positioned closer to the substrate 40 than other areas of the front face 14 has a distance relative to the alignment feature 33 of the supporting device 30. That means that the area 15 of the front face 14 of the optical fiber 10 has a known position relative to the alignment feature 33 of the supporting device, for example relative to the base of the supporting device. When the supporting device 30 is placed on the substrate 40 such that the alignment feature 33 has a certain distance from the alignment feature 41 of the substrate, the front face 14 of the optical fiber 10 will be located in a known position and at a known angle relative to the opto-electronic component 50, assumed that the distance between the opto-electronic component 50 and the alignment mark 41 of the substrate is known.

It is also possible to align the front face 14 of the optical fiber 10 relative to the opto-electronic component 50, for example by using a vision system, or by an active alignment system. When active alignment is provided, the transmission of light between the optical fiber 10 and the opto-electronic component 50 is measured before fixing the supporting device 30 to the substrate 40.

Figure 9:
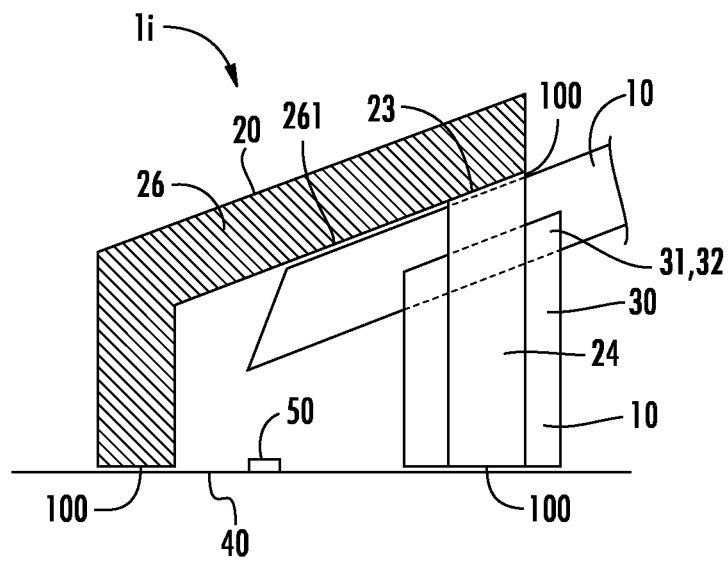
FIG. 9 shows a ninth embodiment of an assembly to couple an optical fiber to an opto-electronic component.

FIG. 9 shows an embodiment of an assembly 1i to couple the optical fiber 10 to the opto-electronic component 50, wherein an upper inner side 261 of the covering portion 26 of the housing 20 is slanted in relation to the substrate 40. The sidewall 24 comprises an opening 21. The sidewall 24 is arranged so that the supporting device 30 may be disposed in the opening of the sidewall 24. The optical fiber is placed within the groove 31, 32 of the supporting device 30. The surface of the fiber may be in contact with the slanted upper inner side 261 of the covering portion 26 of the housing 20. Any gap 23 between the optical fiber 10 and the upper inner side 261 of the housing may be filled with adhesive 100. The housing 20 may be fixed to the substrate 40 carrying the opto-electronic component 50 by the adhesive 100. The groove 31, 32 of the supporting device 30 is slanted with the same deviation as the inner side 261 of the covering portion 26 of the housing 20. This way, when the housing 20 is placed over the optical fiber, the maximum distance between the front face 14 of the optical fiber and the opto-electronic component 50 is limited, providing stability to the fiber position.

Figure 10:
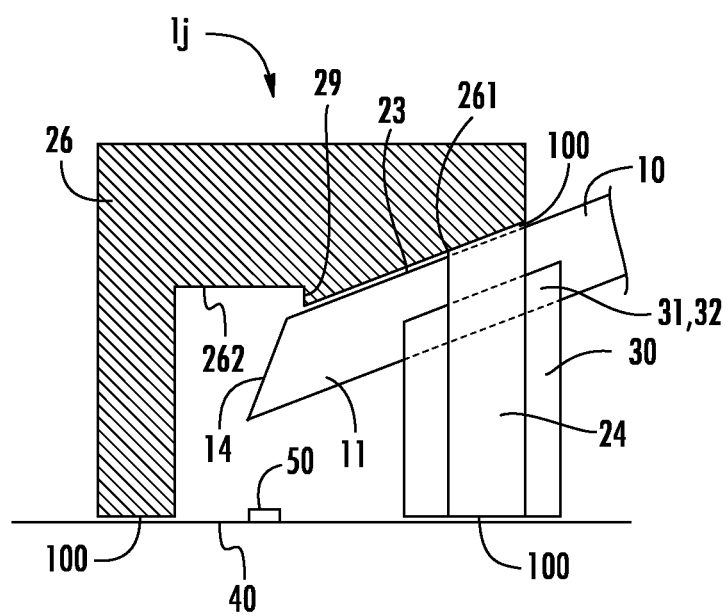
FIG. 10 shows an tenth embodiment of an assembly to couple an optical fiber to an opto-electronic component.

FIG. 10 shows an embodiment of an assembly 1j to couple the optical fiber 10 to the opto-electronic component 50, wherein the covering portion 26 of the housing 20 comprises a section 261 being slanted in relation to the surface of the substrate 40 and a portion 262 being parallel to the surface of the substrate. The section 261 of the covering portion has the same deviation as the cavity 31, 32 of the supporting device. The optical fiber 10 is positioned inside the housing 20 so that the end section 11 of the optical fiber abuts on the inner side 261 of the covering portion 26 of the housing 20. Any gap 23 between the optical fiber 10 and the upper inner side 261 of the housing may be filled with adhesive 100.

Similar to that shown in the embodiment of FIG. 5, the inner side of the covering portion 26 is provided with a recess 29 between the slanted section 261 of the covering portion and the horizontal section 262 of the covering portion 260 of the housing. The optical fiber 10 can be glued to the upper inner side 261 of the covering portion 26 of the housing by providing the adhesive 100 between the surface of the optical fiber and the upper inner side 261 of the covering portion 26. The front face 14 of the optical fiber can be disposed with at a certain distance far away from the opto-electronic component 50. The recess 29 assures that no adhesive will get onto the front face 14 of the optical fiber by capillary effects.

In the embodiments shown in FIGS. 7A to 10 the housing 20 is designed such that in its final position on the substrate 40 any gaps between the housing 20 and the optical fiber 10 and any gaps between the supporting device 30 and the substrate 40 are small on the order of 0.5 mm or below. In particular, the opening 21 for the optical fiber can be formed with a surface 22 such that it is essentially parallel to the surface of the optical fiber. This way, when an adhesive with adequate viscosity is placed inside the gaps 23 or applied from the outside along the gaps 23, these gaps could be filled with adhesive by capillary effects, but no substantial amount of adhesive will get to the inside of the housing. In particular, any adhesive will neither cover the surface of the front face 14 of the optical fiber, nor will the adhesive bring any impurities in the optical path between the optical fiber and the opto-electronic component. Furthermore, by applying any adhesive along all gaps of the assembly, the end section 11 and opto-electronic component 50 will be quasi-hermetically sealed.

Figure 11:
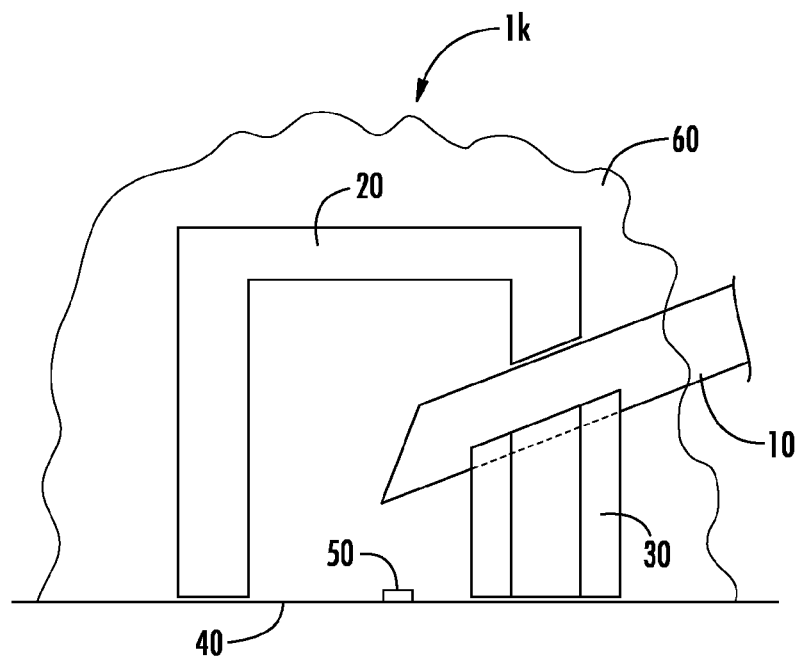
FIG. 11 shows a eleventh embodiment of an assembly to couple an optical fiber to an opto-electronic component.

It is also possible to apply an adhesive to fix the housing to the substrate and to attach the optical fiber 10 in the opening 21 or at the supporting device 30 and then additionally apply a "glob top" material from the outside to cover the whole assembly and thus provide a quasi-hermetic sealing of the assembly. FIG. 11 shows an embodiment of an assembly 1k to couple an optical fiber 10 to an opto-electronic component 50, wherein a sealing component 60 is provided on the substrate 40 over the housing 20.

The sealing compound can be formed from silicone or may be formed as a layer of a plastic material. The thicker the material of the sealing component, the longer it takes for humidity to diffuse into the interior of the housing. Thus, the thickness of the layer will be defined to limit the amount of ingression of moisture over the expected lifetime of the assembly. It is noted that the sealing component 60 can be applied over each of the housings 20 of the embodiments if through 1j shown in FIGS. 8A through 10 so that all the assemblies 1f through 1j are quasi hermetically sealed.

Figure 12:
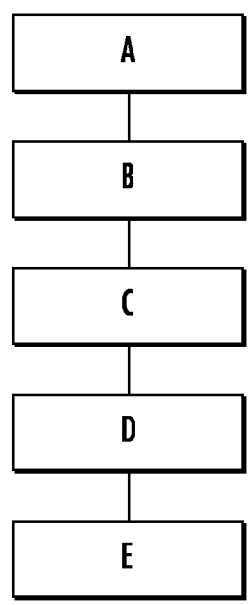
FIG. 12 shows an embodiment of a method to provide the optical fiber with a front face to achieve total internal reflection.

FIG. 12 shows steps A to E of a method to manufacture an optical fiber having an end section with a slanted front face. In particular, the method enables to produce the optical fiber with a refractive element at the end section of the optical fiber having a defined asymmetry so that the optical fiber will be suited to be coupled to asymmetric opto-electronic components such as VCSELs with an asymmetric aperture used, for example, to control an output polarization or photodiodes with an elliptical aperture used, for example, to increase the speed of data transmission.

The optical fiber 10 is provided with a first, second and third section 11, 12, 13 wherein the first section 11 is located between the second and the third section 12, 13 of the optical fiber. In a step A of the method a coating 16 is removed from the portions 11, 12 and 13 of the optical fiber 10. After having stripped-off the coating 16 the optical fiber 10 is cleaned in step B. In a next step C of the method to manufacture the optical fiber the intermediate portion 11 of the optical fiber is heated in order to increase the thickness of the optical fiber at section 11.

Figure 13A:
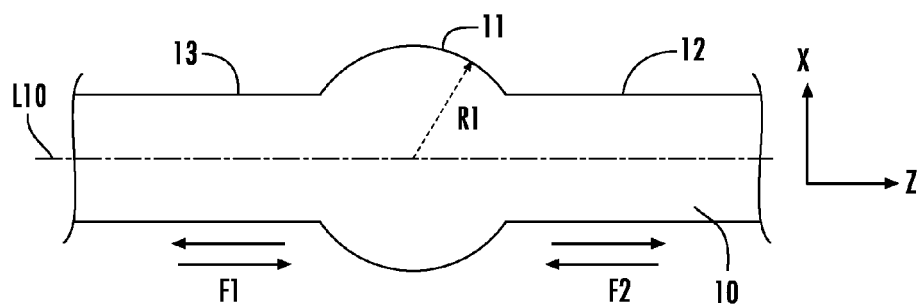
FIG. 13A shows an embodiment of an optical fiber with different sections.

FIG. 13A shows the intermediate portion 11 of the optical fiber having a greater thickness than the adjacent portions 12 and 13 of the optical fiber. The heating can be accomplished by using a $CO_2$ laser, for example with a power of 10 Watt and a beam diameter of 200 μm. In order to prevent any oxidation occurring during heating at the section 11 of the optical fiber, which makes the optical fiber brittle and reduces the reliability of the end product, it is possible to immerse the optical fiber in an inert gas like nitrogen during processing. The heating process of the optical fiber can also be accomplished by using an electric arc of a fusion splicer or a filament of the fusion splicer. The laser beam used for heating could be split and directed onto the optical fiber from two different directions in order to achieve a more radially symmetric heat distribution. Likewise the laser beam that is not absorbed by the optical fiber could be re-imaged onto the optical fiber from a second direction.

Figure 13B:
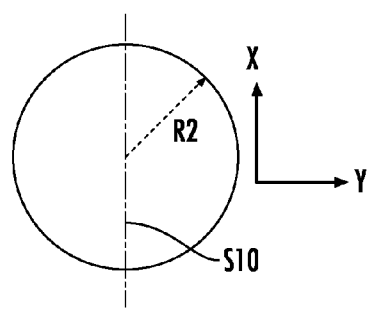
FIG. 13B shows a cross-section of a front face of an optical fiber.

Depending on the exposure time for melting the intermediate portion 11 of the optical fiber, the intermediate portion will have two different radii R1, R2 of curvature in the directions parallel and perpendicular to the fiber axis L10 and S10. FIG. 13A shows the radius R1 parallel to the longitudinal axis L10 of the optical fiber and FIG. 13B shows the radius R2 which is perpendicular to the transverse or vertical axis S10. When heated by a laser device, the different radii R1, R2 may depend on the beam diameter of the laser device. A larger beam diameter will lead to a larger ratio R1/R2. The thickness of the intermediate section 11 of the optical fiber may also be dependent on the exposure time during which the section 11 of the optical fiber is heated. The exposure time may be on the order of half a second to a few seconds.

In order to get further options to control the different radii of curvature of the intermediate portion 11 of the optical fiber, controlled forces F1, F2 parallel to the longitudinal fiber axis L10 can be applied to the optical fiber. The forces F1, F2 can be applied to the optical fiber by a first force applying stage being clamped at section 12 of the optical fiber and a second force applying stage being clamped at section 13 of the optical fiber. The force applying stages can be moved together or apart as shown by the arrows F1, F2 in FIG. 13A. In order to control the force applied to the optical fiber, the force applying stages may comprise a force sensor. According to an alternative embodiment, the self-weight of the optical fiber could be used as one of the forces F1, F2, if the optical fiber is oriented vertically during the melting process. In this case the force could be controlled by the length of the respective fiber end. FIG. 12 shows the step D of applying a controlled force parallel to the longitudinal fiber axis L10.

Figure 13C:
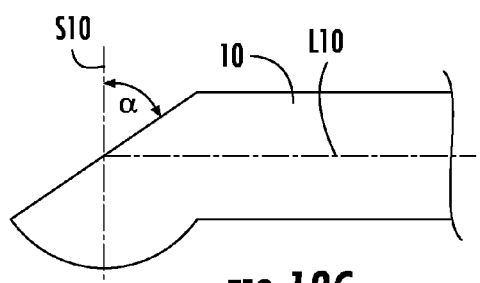
FIG. 13C shows a cleaved end section of an optical fiber.

In step E of FIG. 12 a front face 14 is formed by cleaving the optical fiber 10 at the intermediate section 11. The intermediate section 11 is cleaved, for example by laser-cutting, at an angle α between the transverse axis S10 and the surface of the front face 14 in order to achieve total internal reflection at the front face 14 of the optical fiber. The cleaving angle may be in a range of between 45° and 60°. According to the embodiment shown in FIG. 13C, the intermediate portion 11 of the optical fiber is cleaved at an angle α of about 51°. After cleaving the optical fiber 10 at the section 11 the intermediate section will become an end section of the optical fiber having a front face 14 slanted with an angle between 50° and 60° in relation to the transverse axis S10 of the optical fiber which is directed perpendicular to the longitudinal axis L10 of the optical fiber.

Figure 14:
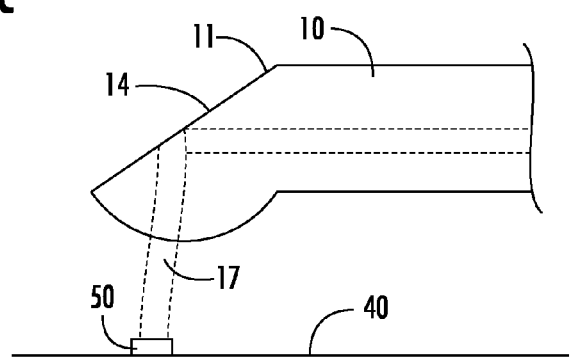
FIG. 14 shows the coupling of light transmitted from an optical fiber to an opto-electronic component.

FIG. 14 shows light being transferred through the optical fiber and coupled out of the optical fiber at the front face 14 towards the opto-electronic component 50 mounted on the substrate 40. A refractive surface 17 underneath the front face 14 will lead to some focusing. Due to the asymmetric shape of the refractive surface 17 provided by the different radii of curvature R1, R2, the optical beam diameter of the reflected light at the position of the opto-electronic component 50 will be different in two directions parallel and perpendicular to the fiber axis L10. Likewise, in the reverse path from the opto-electronic component to the optical fiber an asymmetric beam shape will be transformed into a more symmetric beam shape inside the optical fiber.

By cleaving the intermediate portion 11 of the optical fiber at an angle α close to 45° an optical turn is accomplished when light coming from the inside of the optical fiber hits the front face 14. Thus, the optical fiber can be oriented inside the housing 20 mainly in parallel to the surface of the substrate 40 assumed that the opto-electronic component 50 has an emitting/receiving surface mainly in parallel to the substrate 40. However, if the angle α is greater than 45°, it is necessary to deviate the end section of the optical fiber in relation to the emitting/receiving surface of the opto-electronic component 50 as shown in the embodiments 1a through 1l of the assembly to couple the optical fiber to the opto-electronic component.

The optical fiber as produced by the steps A to E may be used in combination with the assemblies 1a through 1l to couple the optical fiber to an opto-electric component, in particular, when the opto-electronic component is arranged to emit or receive an asymmetric light beam.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

We claim:

1. A method of manufacturing an assembly to couple an optical fiber to an opto-electronic component, comprising:
providing the optical fiber having an end section with a front face to couple light in and out of the optical fiber;
providing a housing to encase the end section of the optical fiber, wherein the housing is formed with an opening to receive the optical fiber;
inserting the optical fiber in the opening such that the end section of the optical fiber is disposed inside the housing;
attaching the optical fiber to a surface of the housing by applying an adhesive within a gap between the optical fiber and the surface, the surface being arranged to form a boundary of the opening; and
aligning the front face of the optical fiber to the opto-electronic component such that light coupled out of the front face of the optical fiber is coupled into the opto-electronic component or light coupled out of the opto-electronic component is coupled into the optical fiber at the front face of the optical fiber.

2. The method of claim 1, comprising:
providing a supporting device to support the optical fiber;
mounting the optical fiber to the supporting device; and
disposing the housing such that the supporting device supporting the optical fiber is placed in the opening of the housing.

3. The method of claim 2, comprising:
providing a substrate with an opto-electronic component mounted thereon; and
mounting the housing and/or the supporting device to the substrate.

4. The method of claim 3, comprising:
providing the supporting device and the substrate respectively with an alignment feature;
positioning the optical fiber in the supporting device so that an area of the front face of the optical fiber has a distance relative to the alignment feature of the supporting device;
aligning the supporting device relative to the alignment feature of the substrate so that the front face of the optical fiber is aligned to the opto-electronic component to couple light from the opto-electronic component into the optical fiber and to couple light from the optical fiber into the opto-electronic component.

5. The method of claim 3, comprising:
providing the housing with an alignment feature;
positioning the optical fiber inside the housing;
determining the position of an area of the front face of the optical fiber relative to the alignment feature of the housing; and
aligning the housing relative to the alignment feature of the substrate so that the front face of the optical fiber is aligned to the opto-electronic component to couple light from the opto-electronic component into the optical fiber and to couple light from the optical fiber into the opto-electronic component.

6. The method of claim 3, comprising
providing the supporting device with a groove to insert the optical fiber, wherein the groove is slanted in relation to the substrate; and
inserting the optical fiber in the groove such that the front face of the optical fiber is disposed closer to the opto-electronic component than a section of the optical fiber disposed in the groove of the supporting component.

7. The method of claim 3, comprising:
providing the housing such that the surface forming the border of the opening is slanted in relation to the substrate; and
inserting the optical fiber in the opening of the housing so that the front face of the optical fiber is disposed closer to the opto-electronic component than a section of the optical fiber disposed in the opening of the housing.

8. The method of claim 1, comprising:
cleaving the end section of the optical fiber by laser cutting to provide the end section of the optical fiber with the front face being adapted to couple light into/out of the optical fiber.

9. The method of claim 1, comprising:
providing a sealing component and covering the housing with the sealing component to seal the opening of the housing.

10. The method of claim 1, comprising:
providing the optical fiber having a first, second and third section, wherein the first section is located between the second and the third sections;
heating the first section of the optical fiber;
increasing a thickness of the optical fiber at the first section by the heating of the first section such that the first section of the optical fiber is provided with a first and second radii of curvature in the directions parallel and perpendicular to a longitudinal axis of the optical fiber, wherein the first and second radii are different from each other; and cleaving the optical fiber at the first section so that the end section of the optical fiber is provided with the front face slanted with an angle between 40° and 60° in relation to an axis of the optical fiber which is directed perpendicular to the longitudinal axis of the optical fiber.

11. The method of claim 10, comprising:

applying a force in direction to the longitudinal axis of the optical fiber and controlling the amount of the first and second radii of curvature by the applied force.

12. The method of claim 1, wherein:

the housing comprises a first sidewall, a second sidewall, and a covering portion between the first sidewall and the second sidewall; and the opening is provided within the first sidewall.

13. The method of claim 1, wherein the housing surrounds the opto-electronic device.

14. A method of manufacturing an assembly to couple an optical fiber to an opto-electronic component, comprising:

providing a substrate with an opto-electronic component mounted thereon;

providing the optical fiber having an end section with a front face to couple light in and out of the optical fiber;

providing a housing to encase the end section of the optical fiber, wherein the housing is formed with an opening to receive the optical fiber;

mounting the housing to the substrate;

inserting the optical fiber in the opening such that the end section of the optical fiber is disposed inside the housing;

attaching the optical fiber to a surface of the housing by applying an adhesive within a gap between the optical fiber and the surface, the surface being arranged to form a boundary of the opening; and aligning the front face of the optical fiber to the opto-electronic component such that light coupled out of the front face of the optical fiber is coupled into the opto-electronic component or light coupled out of the opto-electronic component is coupled into the optical fiber at the front face of the optical fiber.

15. The method of claim 14, comprising:

providing a supporting device to support the optical fiber;

mounting the optical fiber to the supporting device; and disposing the housing such that the supporting device supporting the optical fiber is placed in the opening of the housing.

16. The method of claim 15, comprising:

providing the supporting device and the substrate respectively with an alignment feature;

positioning the optical fiber in the supporting device so that an area of the front face of the optical fiber has a distance relative to the alignment feature of the supporting device;

aligning the supporting device relative to the alignment feature of the substrate so that the front face of the optical fiber is aligned to the opto-electronic component to couple light from the opto-electronic component into the optical fiber and to couple light from the optical fiber into the opto-electronic component.

17. The method of claim 15, comprising providing the supporting device with a groove to insert the optical fiber, wherein the groove is slanted in relation to the substrate; and inserting the optical fiber in the groove such that the front face of the optical fiber is disposed closer to the opto-electronic component than a section of the optical fiber disposed in the groove of the supporting device.

18. The method of claim 14, comprising:

cleaving the end section of the optical fiber by laser cutting to provide the end section of the optical fiber with the front face being adapted to couple light into/out of the optical fiber.

19. The method of claim 14, comprising:

providing the housing with an alignment feature;

positioning the optical fiber inside the housing;

determining the position of an area of the front face of the optical fiber relative to the alignment feature of the housing; and aligning the housing relative to the alignment feature of the substrate so that the front face of the optical fiber is aligned to the opto-electronic component to couple light from the opto-electronic component into the optical fiber and to couple light from the optical fiber into the opto-electronic component.

20. The method of claim 14, comprising:

providing the housing such that the surface forming the border of the opening is slanted in relation to the substrate; and inserting the optical fiber in the opening of the housing so that the front face of the optical fiber is disposed closer to the opto-electronic component than a section of the optical fiber disposed in the opening of the housing.

21. The method of claim 14, comprising:

providing a sealing component and covering the housing with the sealing component to seal the opening of the housing.

22. A method of manufacturing an assembly to couple an optical fiber to an opto-electronic component, comprising:

providing the optical fiber having an end section with a front face to couple light in and out of the optical fiber;

providing a housing to encase the end section of the optical fiber, wherein the housing is formed with an alignment feature and an opening to receive the optical fiber;

inserting the optical fiber in the opening such that the end section of the optical fiber is disposed inside the housing;

attaching the optical fiber to a surface of the housing by applying an adhesive within a gap between the optical fiber and the surface, the surface being arranged to form a boundary of the opening; and aligning the front face of the optical fiber to the opto-electronic component such that light coupled out of the front face of the optical fiber is coupled into the opto-electronic component or light coupled out of the opto-electronic device is coupled into the optical fiber at the front face of the optical fiber.

* * * * *